US011210123B2

(12) United States Patent
Devine et al.

(10) Patent No.: US 11,210,123 B2
(45) Date of Patent: *Dec. 28, 2021

(54) SECURING LIVE MIGRATION OF A VIRTUAL MACHINE INCLUDING BLOCKING COMMUNICATION WITH OTHER VIRTUAL MACHINES

(71) Applicant: International Business Machines Corporation, Armonk, NY (US)

(72) Inventors: Wesley M. Devine, Apex, NC (US); Sivaram Gottimukkala, Morrisville, NC (US); Lap T. Huynh, Cary, NC (US); Dinakaran Joseph, Apex, NC (US); Michael S. Law, Morrisville, NC (US); Linwood H. Overby, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/610,614

(22) Filed: May 31, 2017

(65) Prior Publication Data
US 2017/0329624 A1 Nov. 16, 2017

Related U.S. Application Data

(63) Continuation of application No. 12/210,249, filed on Sep. 15, 2008, now Pat. No. 9,715,401.

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01)

(58) Field of Classification Search
CPC ......... G06F 9/45558; G06F 2009/4557; G06F 9/4856
See application file for complete search history.

(56) References Cited

U.S. PATENT DOCUMENTS 7,146,419 B1   12/2006   O'Rourke et al.
7,257,811 B2   8/2007    Hunt et al.
(Continued)

FOREIGN PATENT DOCUMENTS

JP    2005327279 A    11/2005
WO    2010029123 A1    3/2010

OTHER PUBLICATIONS

Vmware, "VMware VMotion—Live Migration of Virtual Machines without Service Interruption", Jun. 25, 2006, 2 pages.*
VMware, "Connecting Two Virtual Machines", Jul. 18, 2005, 3 pages. Retrieved from the Internet: < URL: https://web.archive.org/web/20050718005354/http://www.vmware.com/support.
Clark et al. "Live Migration of Virtual Machines", NSDI'05 Proceedings of the 2nd conference on Symposium on Networked Systems Design & Implementation—vol. 2, 2005, 12 pa.
(Continued)

*Primary Examiner* — David J. Huisman
(74) *Attorney, Agent, or Firm* — Christopher M. Pignato

(57) ABSTRACT

A method for secure live migration of a virtual machine (VM) in a virtualized computing environment can include selecting a VM in a secure virtualized computing environment for live migration to a different virtualized computing environment and blocking data communications with the selected VM and other VMs in the secure virtualized computing environment. The selected VM can be live migrated to the different virtualized computing environment and the VM can be restarted in the different virtualized computing environment. Notably, a secure communicative link can be established between the restarted VM and at least one other of the VMs in the secure virtualized computing environment. Finally, data communications between the restarted VM and the at least one other of the VMs can be enabled over the secure communicative link.

4 Claims, 2 Drawing Sheets

(56) References Cited

U.S. PATENT DOCUMENTS

| | | |
|---|---|---|
| 7,448,079 B2 | 11/2008 | Tremain |
| 7,761,573 B2 | 7/2010 | Travostino et al. |
| 9,715,401 B2 * | 7/2017 | Devine ............... G06F 9/45558 |
| 2002/0069369 A1 | 6/2002 | Tremain |
| 2005/0289648 A1 | 12/2005 | Grobman |
| 2007/0079307 A1 | 4/2007 | Dhawan et al. |
| 2007/0124434 A1 | 5/2007 | Smith |
| 2007/0180436 A1 | 8/2007 | Travostino et al. |
| 2007/0255840 A1 | 11/2007 | Jones et al. |
| 2008/0163207 A1 | 7/2008 | Reumann |
| 2008/0222633 A1 | 9/2008 | Kami |
| 2009/0063749 A1 | 3/2009 | Dow |
| 2009/0132804 A1 | 5/2009 | Paul et al. |
| 2009/0138752 A1 | 5/2009 | Graham et al. |
| 2009/0204718 A1 | 8/2009 | Lawton et al. |

OTHER PUBLICATIONS

"International Search Report and Written Opinion", International Application No. PCT/EP2009/061743, International Filing Date Oct. 10, 2009.

Masaki Tatezono et al., "MPI Environment with Load Balancing using Virtual Machine" IEICE Technical Report, The Institute of Electronics, Information and Communication Engineers, vol. 105 No. 225, p. 7-12, publication date Jul. 2, 2005, English Abstract.

Huang, et al. "Virtual Machine Aware Communication Libraries for High Performance Computing", SC 07 Nov. 10-16, 2007, Reno Nevada, USA, (c) 2007 ACM 978-1-59593,764-3/07/0011, 12 pages.

Kourai, et al. "HyperSpector: Virtual Distributed Monitoring Environments for Secure Intrusion Detection", VEE '05, Jun. 11-12, 2005, Chicago, Illinois, USA, Copyright 2005 ACM 1-59593-047-7/05/0006, 12 pages.

* cited by examiner

SECURING LIVE MIGRATION OF A VIRTUAL MACHINE INCLUDING BLOCKING COMMUNICATION WITH OTHER VIRTUAL MACHINES

CROSS-REFERENCE TO RELATED APPLICATIONS

This application is a Continuation of U.S. patent application Ser. No. 12/210,249, filed Sep. 15, 2008, now U.S. Pat. No. 9,715,401, the entirety of which is incorporated herein by reference.

BACKGROUND OF THE INVENTION

Field of the Invention

The present invention relates to the field of virtualization and more particularly to migrating a virtual machine in a virtualized environment.

Description of the Related Art

For many decades, computing implied both an application and a supporting platform. Until the late twentieth century, a host computing environment included a hardware infrastructure of processor core, input/output, memory and fixed storage, the combination of which supported an operating system, which in turn supported the execution of a single application at a time. Gradually, as processor power increased exponentially, advanced forms of the operating system enabled both simulated and actual multi-tasking such that multiple applications could execute within the same host computing environment.

Initially, applications were self contained bundles of logic relying on little other than core object files and related resource files. As computing has become integral to modern industry, however, applications became co-dependent on the presence of other applications such that the requisite environment for an application included not only the underlying operating system and supporting hardware platform, but also other key applications including application servers, database management servers, collaboration servers and communicative logic commonly referred to as middleware. Given the complexity of application and platform interoperability, however, different combinations of applications executing in a single hardware platform can demonstrate differing degrees of performance and stability.

Virtualization as a technology aims to interject a layer between the hardware platform and operating system and executing applications. From the perspective of business continuity and disaster recovery, virtualization provides the inherent advantage of environment portability. Specifically, to move an entire environment configured with multiple different applications is a matter of moving a virtual image from one supporting hardware platform to another. Further, more powerful computing environments can support the coexistence of multiple different virtual images, all the while maintaining a virtual separation between the images. Consequently, a failure condition in one virtual image cannot jeopardize the integrity of other co-executing virtual images in the same hardware platform.

A virtual machine monitor, known in the art as a "hypervisor", manages the interaction between each virtual image and the underlying resources provided by the hardware platform. In this regard, a bare metal hypervisor runs directly on the hardware platform much as an operating system runs directly on hardware. By comparison, a hosted hypervisor runs within a host operating system. In either case, the hypervisor can support the operation of different "guest operating system images"—known as virtual machine (VM) images—the number of VM images being limited only by the processing resources of a VM container holding the VM images or the hardware platform itself.

Virtualization has proven especially useful for those end users requiring separate computing environments for different types of applications while being limited to a single hardware platform. For instance, it is well known for a primary operating system native to one type of hardware platform to provide a virtualized guest operating system native to a different hardware platform so that applications requiring the presence of the guest operating system can co-exist with other applications requiring the presence of the primary operating system. In this way, the end user need not provide separate computing environments each to support a different type of application. Yet, no matter the guest operating system, access to underlying resources of the single hardware platform remains static.

Virtualized environments have been deployed to aggregate different interdependent applications in different VMs in composing an applications solution. For instance, an application server can execute within one VM while a database management system can execute in a different VM and further while a Web server can execute in yet another VM. Each VM can be communicatively coupled to one another in a secure network, however, any given one of deployment of the applications can be live migrated to a different deployment without interfering with the execution of the other applications in the other VMs. In a typical live migration, a VM can be moved from one host server to another in order to permit server maintenance or to permit an improvement in hardware support for the VM.

Embodiments of the present invention address deficiencies of the art in respect to live migration in a virtualized environment and provide a novel and non-obvious method, system and computer program product for secure live migration of a VM outside of a secure computing environment. In an embodiment of the invention, a method for secure live migration of a VM in a virtualized computing environment can include selecting a VM in a secure virtualized computing environment for live migration to a different virtualized computing environment and blocking data communications with the selected VM and other VMs in the secure virtualized computing environment. The selected VM can be live migrated to the different virtualized computing environment and the VM can be restarted in the different virtualized computing environment. Notably, a secure communicative link can be established between the restarted VM and at least one other of the VMs in the secure virtualized computing environment. Finally, data communications between the restarted VM and the at least one other of the VMs can be enabled over the secure communicative link.

BRIEF SUMMARY OF THE INVENTION

Embodiments of the present invention address deficiencies of the art in respect to live migration in a virtualized environment and provide a novel and non-obvious method, system and computer program product for secure live migration of a VM outside of a secure computing environment. In an embodiment of the invention, a method for secure live migration of a VM in a virtualized computing environment can include selecting a VM in a secure virtualized computing environment for live migration to a different virtualized computing environment and blocking data communications with the selected VM and other VMs in the secure virtualized computing environment. The selected VM can be live migrated to the different virtualized computing environment and the VM can be restarted in the different virtualized computing environment. Notably, a secure communicative link can be established between the restarted VM and at least one other of the VMs in the secure virtualized computing environment. Finally, data communications between the restarted VM and the at least one other of the VMs can be enabled over the secure communicative link.

In another embodiment of the invention, a virtualized computing data processing system can be provided. The system can include a secure virtualized computing environment comprising a hypervisor managing VMs within the secure virtualized computing environment. The system also can include a different virtualized computing environment comprising a hypervisor managing VMs within the different virtualized computing environment. Notably, live migration logic can be coupled to each of the secure virtualized computing environment and the different virtualized computing environment.

The logic can include program code enabled to select one of the VMs in a secure virtualized computing environment for live migration to the different virtualized computing environment and to block data communications with the selected VM and other VMs in the secure virtualized computing environment. The program code also can be enabled to live migrate the selected VM to the different virtualized computing environment and to restart the VM in the different virtualized computing environment. Yet further, the program code can be enabled to establish a secure communicative link between the restarted VM and at least one other of the VMs in the secure virtualized computing environment. Finally, the program code can be enabled to enable data communications between the restarted VM and the at least one other of the VMs over the secure communicative link.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for secure live migration in a virtualized computing environment. In accordance with an embodiment of the present invention, a grouping of VMs can be arranged in a secure virtualized environment, each hosting an application component for a computing application. A selected VM amongst the VMs can be live migrated to a host in a different virtualized environment communicatively coupled to the secure virtualized environment over an unsecured computer communications network, for instance the global Internet. In the course of live migration, however, communications between the selected VM and the other VMs can be terminated prior to the live migration. Thereafter, the selected VM can be restarted in the different virtualized environment and a secure tunnel can be established between the selected VM and the other VMs. Finally, the selected VM and the other VMs can interoperate over the computer communications network through the tunnel so as to ensure secure data communications therebetween.

Figure 1:
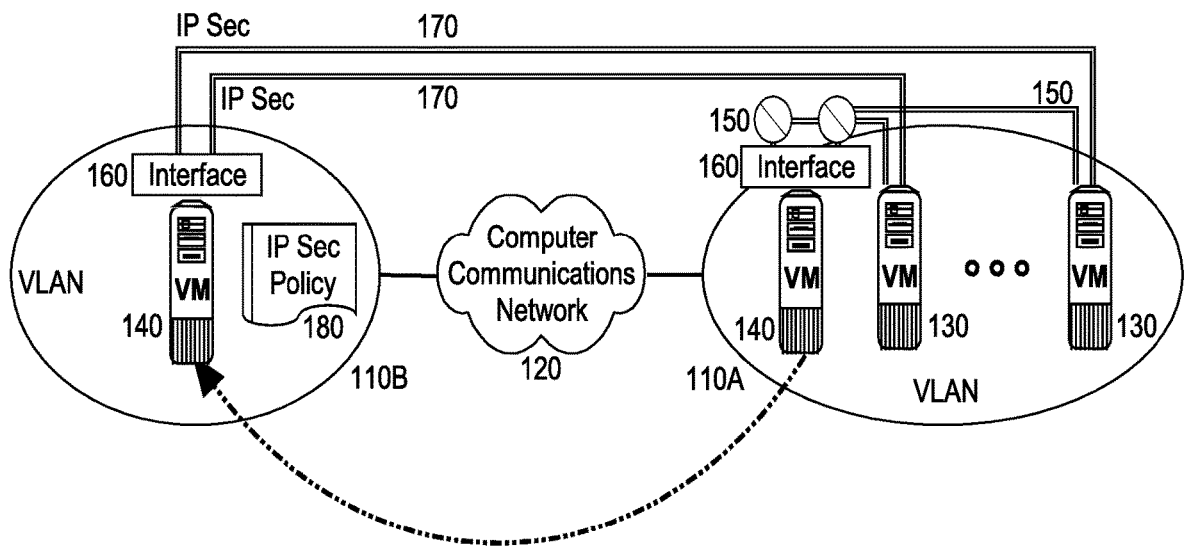
FIG. 1 is a pictorial illustration of a process for secure live migration in a virtualized computing environment.

In illustration, FIG. 1 pictorially depicts a process for secure live migration in a virtualized computing environment. As shown in FIG. 1, a secure virtualized environment 110A can be provided to include multiple different VMs 130, 140 interoperating with one another through hosted application components to form a composite application. Each of the VMs 130, 140 can communicate with one another over internal communicative links 150. A selected VM 140 amongst the VMs 130, 140 can be live migrated to a different virtualized environment 110B communicatively coupled to the secure virtualized environment 110A over computer communications network 120.

Prior to performing the live migration of the selected VM 140, however, a network interface 160 supporting the communicative links 150 with the other VMs 130 can be disabled, or traffic between the selected VM 140 and the other VMs 130 can be disabled or otherwise inhibited through management of the network interface 160. Once the selected VM 140 has been live migrated to the different virtualized environment 110B, secure communicative links 170 can be established between the selected VM 140 and the other VMs 130 over the computer communications network 120. In this regard, to the extent the secure communicative links 170 conform to Internet protocol (IP) Security (IPSec), an IPSec policy 180 can be established for the secure communicative links 170 and installed in connection with the selected VM 140. Thereafter, interoperability between the selected VM 140 and the other VMs 130 can be enabled.

Figure 2:
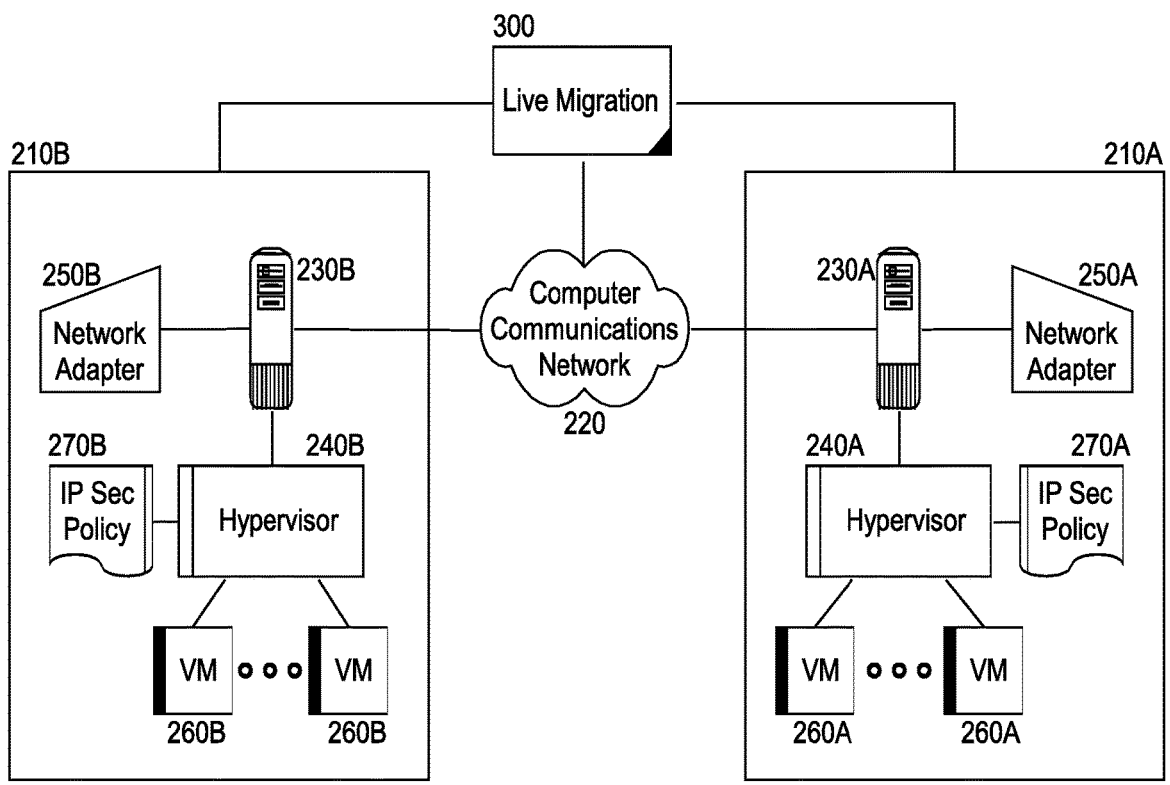
FIG. 2 is a schematic illustration of virtual computing data processing system configured for secure live migration; and, FIG. 3 is a flow chart illustrating a process for secure live migration in a virtualized computing environment.

The process described in connection with FIG. 1 can be implemented in a virtual computing data processing system. In illustration, FIG. 2 schematically shows a virtual computing data processing system configured for secure live migration. The system can include a secure virtualized computing environment 210A communicatively coupled to a different virtualized computing environment 210B over computer communications network 220, for instance the global Internet. The secure virtualized computing environment 210A can include at least one host server 230A supporting the operation of a hypervisor 240A. The hypervisor 240A, in turn, can manage the operation of multiple different VMs 260A and each VM 260A can host the execution of one or more application components (not shown) combined to provide a computing application.

The different virtualized computing environment 210B also can include at least one host server 230B supporting the operation of a hypervisor 240B. The hypervisor 240B, in turn, can manage the operation of multiple different VMs 260B and each VM 260B can host the execution of one or more application components (not shown) combined to provide a computing application. Of note, live migration logic 300 can be coupled both to the secure virtualized computing environment 210A and the different virtualized computing environment 210B. The live migration logic 300 can include program code enabled to live migrate a selected one of the VMs 260A from the secure virtualized computing environment 210A to the different virtualized computing environment 210B while maintaining the security of data communications therebetween.

Specifically, the program code of the live migration logic 300 can be enabled to configure a network adapter 250A for the host server 230A to disable, filter or otherwise block data communications between the VMs 260A in the secure virtualized computing environment 210A when live migrating a selected one of the VMs 260A to the different virtualized computing environment 210B as a VM 260B in the different virtualized computing environment 210B. Further, the program code of the live migration logic 300 can be enabled to restart the live migrated one of the VMs 260B in the different virtualized computing environment 210B and to re-establish data communications between the live migrated one of the VMs 260B and the VMs 260A in the secure virtualized computing environment 210A.

In particular, an IPSec policy 270B can be associated with network adapter 250B for the host server 230B in establishing a tunnel between the host server 230B and the host server 230A. Likewise, an IPSec policy 270A can be associated with network adapter 250A for the host server 230A in establishing the tunnel between the host server 230A and the host server 230B. Of course, it is to be recognized that the tunnel can accommodate not only traffic flowing between the VMs 260A, 260B managed by the hypervisers 240A, 240B, respectively, but also intermediate devices such as edge routers and security appliances, to name a couple of examples. Once the tunnel has been established, the program code of the live migration logic 300 can be enabled to resume data communications between the live migrated one of the VMs 260B in the different virtualized computing environment 210B and the VMs 260A in the secure virtualized computing environment 210A.

Figure 3:
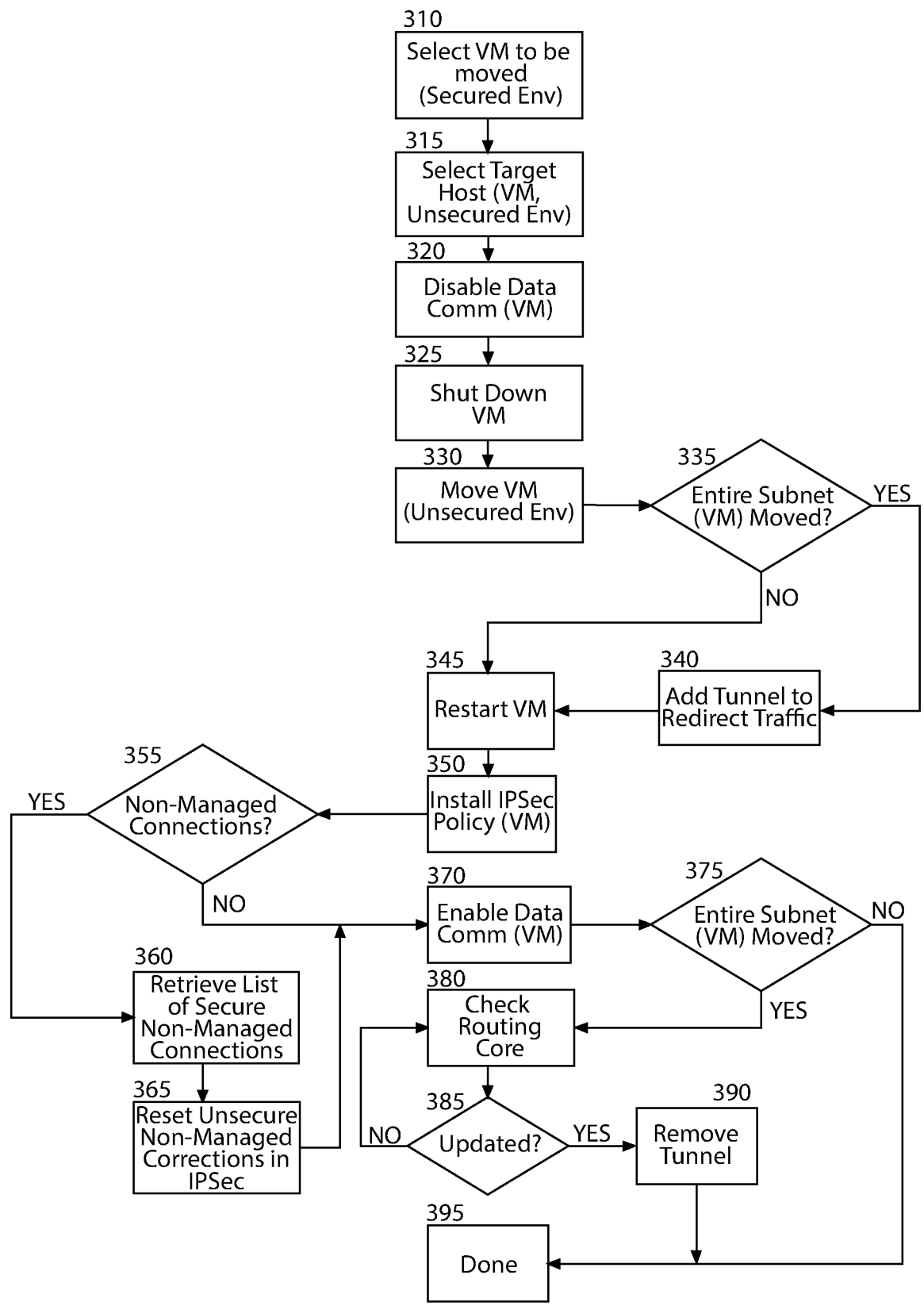

In yet further illustration of the operation of the live migration logic 300, FIG. 3 is a flow chart illustrating a process for secure live migration in a virtualized computing environment. Beginning in block 310, a VM in a secure virtualized computing environment can be selected for live migration and in block 315 a different virtualized computing environment separate from the secure virtualized computing environment can be targeted for the live migration of the VM. In block 320, data communications with the selected VM can be disabled and in block 325, the VM can be shut down in the secure virtualized computing environment.

In block 330, the selected VM can be live migrated to the different virtualized computing environment. In decision block 335, it can be determined whether an entire subnet for the selected VM has been moved to the different virtualized computing environment. If so, in block 340 a tunnel can be established between the secure virtualized computing environment and the different virtualized computing environment to redirect traffic in the secure virtualized computing environment intended for the selected VM to the different virtualized computing environment. In block 345 the selected VM can be restarted in the different virtualized computing environment and in block 350 an IPSec policy can be configured and installed in connection with the selected VM in decision block 355 it can be determined whether or not non-managed connections persist between the selected VM and other communicative entities. If so, in block 360 a list of already secure non-managed connections can be retrieved, for instance those connections secured through IPSec, application transparent (AT)-transport layer security (TLS) and unconditional TLS ports. The remaining unsecured ones of the non-managed connections can be reset in block 365 and re-established as secured connections.

Thereafter, in block 370, data communications can be enabled between the VM in the different virtualized computing environment and other VMs in the secure virtualized computing environment. In decision block 375, again it can be determined whether an entire subnet for the selected VM has been moved to the different virtualized computing environment. If so, in block 380, the routing core for the secure virtualized computing environment can be inspected to determine whether a proper routing configuration has propagated to the routing core to enable routing of data packets to the different virtualized computing environment irrespective of the tunnel. In decision block 385 it can be determined whether the routing core has been updated to enable routing of data packets to the different virtualized computing environment irrespective of the tunnel. If not, the routing core can be inspected again in block 380. Once the routing core has been updated, however, in block 390 the tunnel can be removed and the process can end in block 395.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A computer program product comprising a non-transitory computer usable medium embodying computer usable program code for secure live migration of a virtual machine (VM) in a virtualized computing environment, the computer program product comprising:
    computer usable program code for selecting a VM in a secure virtualized computing environment for live migration to a different virtualized computing environment and blocking data communications between the selected VM and other VMs in the secure virtualized computing environment;
    computer usable program code for live migrating the selected VM to the different virtualized computing environment and restarting the selected VM in the different virtualized computing environment;
    computer usable program code for establishing a secure communicative link between the restarted VM and at least one other of said other VMs in the secure virtualized computing environment;
    computer usable program code for enabling data communications between the restarted VM and the at least one other of said other VMs over the secure communicative link
    computer usable program code for adding a tunnel between a routing core of the secure virtualized computing environment and the restarted VM; and,
    computer usable program code for removing the tunnel in response to detecting an update to the routing core permitting routing of data packets from said other VMs in the secure virtualized computing environment to the restarted VM.

2. The computer program product of claim 1, further comprising:
    computer usable program code for adding a tunnel between a routing core of the secure virtualized computing environment and the restarted VM;
    and, computer usable program code for removing the tunnel in response to determining an update to the routing core permitting routing of data packets from said other VMs in the secure virtualized computing environment to the restarted VM.

3. The computer program product of claim 1, wherein the computer usable program code for establishing a secure communicative link between the restarted VM and at least one other of said other VMs in the secure virtualized computing environment, comprises:
    computer usable program code for configuring an Internet protocol Security (IPSec) policy for secure communications between the restarted VM and the at least one other of said other VMs in the secure virtualized computing environment; and,
    computer usable program code for establishing an IPSec conformant communicative link between the restarted VM and the at least one other of said other VMs in the secure virtualized computing environment according to the configured IPSec policy.

4. The computer program product of claim 1, wherein the computer usable program code for enabling data communications between the restarted VM and the at least one other of said other VMs over the secure communicative link, comprises:
    computer usable program code for determining non-managed connections persisting between the selected VM and other communicative entities;
    computer usable program code for identifying unsecured ones of the non-managed connections; and,
    computer usable program code for resetting the identified unsecured ones of the non-managed connections as secured connections and re-establishing the unsecured ones of the non-managed connections as secured connections.

* * * * *